US008769491B1

(12) United States Patent
Conti et al.

(10) Patent No.: US 8,769,491 B1
(45) Date of Patent: Jul. 1, 2014

(54) ANNOTATIONS FOR DYNAMIC DISPATCH OF THREADS FROM SCRIPTING LANGUAGE CODE

(75) Inventors: Joe Conti, Boston, MA (US); Michael Patrick Bushe, Hopkinton, MA (US); Roy Lurie, Wayland, MA (US); Joseph F. Hicklin, Upton, MA (US); Pieter J. Mosterman, Framingham, MA (US)

(73) Assignee: The MathWorks, Inc., Natick, MA (US)

( * ) Notice: Subject to any disclaimer, the term of this patent is extended or adjusted under 35 U.S.C. 154(b) by 1514 days.

(21) Appl. No.: 11/937,170

(22) Filed: Nov. 8, 2007

(51) Int. Cl.
*G06F 9/44* (2006.01)
*G06F 9/46* (2006.01)
*G06F 15/16* (2006.01)

(52) U.S. Cl.
USPC .......................... 717/115; 718/102; 709/201

(58) Field of Classification Search
None
See application file for complete search history.

(56) References Cited

U.S. PATENT DOCUMENTS

| | | | | | |
|---|---|---|---|---|---|
| 5,261,097 | A | * | 11/1993 | Saxon | 718/106 |
| 6,886,024 | B1 | * | 4/2005 | Fujita et al. | 709/201 |
| 6,971,084 | B2 | * | 11/2005 | Grey et al. | 717/106 |
| 7,861,222 | B2 | * | 12/2010 | Ramsey et al. | 717/115 |
| 2004/0078779 | A1 | * | 4/2004 | Dutt et al. | 717/106 |
| 2005/0053968 | A1 | * | 3/2005 | Bharadwaj et al. | 435/6 |
| 2005/0060608 | A1 | * | 3/2005 | Marchand | 714/18 |
| 2006/0059473 | A1 | * | 3/2006 | Moler | 717/149 |
| 2006/0101050 | A1 | * | 5/2006 | Choy et al. | 707/101 |
| 2006/0107266 | A1 | * | 5/2006 | Martin et al. | 718/100 |
| 2006/0242223 | A1 | * | 10/2006 | Shawver et al. | 709/201 |

OTHER PUBLICATIONS

Smith, W., et al., "An Execution Service for Grid Computing", Proc. of the 5th IEEE/ACM Intl. Wksp. on Grid Computing [online], Apr. 2004 [retrieved Aug. 25, 2011], Retrived from Internet <http://citeseerx.ist.psu.edu/viewdoc/download?doi=10.1.1.139.9337&rep=rep1&type=pdf>, pp. 1-8.*
The Mathworks, Distributed Computing Toolbox 3, User's Guide [online], 2007 [retrieved Aug. 25, 2011], Retrieved from Internet <http://wbsp.arb.Itu.se/ITSInfo/matlab-distributed-computing/matlab-distributed-computing-documents/distcomp.pdf>, pp. i-iii, 1-2, 1-3.*
Welch, B., et al., "Multi-Threaded Tcl Scripts" in: Practical Programming in Tcl and Tk, 4th Ed. [online], Prentice Hall, 2003 [retrieved Jul. 31, 2013], Retrieved from Internet: <http://www.beedub.com/book/4th/Threads.pdf>, pp. 321-348.*
Callaway, T. (Ed.), "Perl Programmers Reference Guide: A Tutorial on Threads in Perl" [online], Redhat, 2004 [retrieved Jul. 31, 2013], Retrieved from Internet: <http://people.redhat.com/tcallawa/whitepapers/PerlThreadingTutorial.pdf>, pp. 1-19.*
Anonymous, "JPype 0.4—User Guide," SourceForge [online], 2005 [retrieved Feb. 19, 2014], Retrieved from Internet: <URL http://web.archive.org/web/20050907235206/http://jpype.sourceforge.net/doc/user-guide/userguide.html>, pp. 1-12.*
The MathWorks, "Distributed Computing Toolbox, for Use with Matlab, User's Guide, Version 1," The MathWorks, Inc. (2004).

* cited by examiner

*Primary Examiner* — Don Wong
*Assistant Examiner* — Todd Aguilera
(74) *Attorney, Agent, or Firm* — Harrity & Harrity, LLP

(57) ABSTRACT

Exemplary embodiments provide annotations for dynamic dispatch of threads from scripting language code. Exemplary embodiments may provide scripting language code and execute the code causing examination of at least one annotation associated with a referenced collection of code. Exemplary embodiments may dynamically dispatch a first task to a first thread automatically from the scripting language code at runtime based on the examination of the at least one annotation associated with the referenced collection of code.

25 Claims, 22 Drawing Sheets

Scripting language code:
...
doStuff(); —— 212
...

Collection of code: 220
@RunOnEventDispatchThread 221
public void doStuff() { —— 222
    ...
}

*Fig. 2A*

Scripting language code:
...
doOtherStuff(); — 232
...

Collection of code: 240
@RunOnMATLABThread — 241
public void doOtherStuff() { — 242
    ...
}

Scripting language code: *250*
...
MATLABInternalNonAccessibleMethod (); *252*
...

Collection of code: *260*
@NoJMIAccess *261*
public void MATLABInternalNonAccessibleMethod() {
    ...
} *262*

*Fig. 2C*

```
Collection of code 1:                 1110
@MainThreadPolicy                 1111
public void mymethod() {          1112
    myeventmethod();
}
```

```
Collection of code 2:             1120
@EventThreadPolicy                1121
public void myeventmethod() {     1122
    ...
}
```

```
Output from thread safety analysis tool:
Thread policy mismatch error for mymethod()    1130
calling myeventmethod()
```

*Fig. 11A*

Collection of code 1: —— 1140
@MainThreadPolicy —— 1141
private Boolean fFoo = true; —— 1142

Collection of code 2: —— 1150
@EventThreadPolicy —— 1151
public void myeventmethod() { —— 1152
    fFoo = false; —— 1153
}

Output from thread safety analysis tool:
Thread policy mismatch error for
*myeventmethod*() calling *fFOO*

*Fig. 11B*

Collection of code: —— 1170
@MainThreadPolicy —— 1171
public void mymethod() { —— 1172
JButton mybutton = new JButton(); —— 1173
}

Output from thread safety analysis tool:
Thread policy mismatch error for *mymethod*()
calling *javax.swing.JButton*()

*Fig. 11C*

LOOP 1: *1400*

Loop through a set of Java classes

LOOP 2: *1410*

Loop through each method defined in a Java class

For each method, determine its thread policy based on the provided annotations, 1412

If a thread policy is not defined for the method, load in the thread policy for the method's defining class, 1414

If a thread policy is not defined for the method's defining class and the defining class is an inner class or an anonymous class, load in the thread policy for the parent owning class, 1416

LOOP 3: *1420*

For each method defined in a Java class, loop through all of the invoked methods and invoked fields by reading instructions on the Java byte code class file For each invoked method or invoked field, determine the thread policy, 1422

If the thread policy of the invoked method or invoked field is not compliant with the thread policy of the calling method, throw a thread mismatch error to the user, 1424

END LOOP 3

END LOOP 2

END LOOP 1

*Fig. 14*

ANNOTATIONS FOR DYNAMIC DISPATCH OF THREADS FROM SCRIPTING LANGUAGE CODE

BACKGROUND

A script is a sequence of commands written in a scripting language that may be interpreted rather than compiled. A scripting language is a programming language that implements scripts. A script may be generated using a text editor or a Graphical User Interface (GUI).

One example of a mathematical scripting language is MATLAB® software from The MathWorks, Inc. of Natick, Mass. MATLAB® software integrates numerical analysis, matrix computation, signal processing, and graphics in a language in which problems and solutions are expressed in familiar mathematical notation without traditional programming. A mathematical scripting language may be used to solve complex engineering and scientific problems by developing mathematical models that simulate a problem.

Code written in a scripting language may execute a task, like a function/method call, etc., by dispatching the task to a thread. Event notifications may also be dispatched to a thread for handling. The threads to which the tasks and/or event notifications are dispatched may be running in a computing environment supporting the same scripting language as the code executing the task, in a computing environment supporting a different scripting language than the code executing the task, or in a computing environment supporting a non-scripting language. A thread is a portion of a program that may be executed independently as a sequence of instructions. A thread, when executed, can perform a task, and multiple threads may be processed concurrently to perform multiple tasks. When multiple threads are running in a computing environment, each thread may be configured for processing a certain type of task or event. For example, in Swing™, the GUI toolkit for JAVA™, the following threads may be running at the same time: initial threads that execute initial application code, the event dispatch thread (EDT) that executes event-handling code and/or most code that interacts with the SWING framework, and background threads that execute time-consuming background tasks.

SUMMARY

In one embodiment, a computer-readable medium used in a computing system holds computer-executable instructions that, when executed, dynamically dispatch tasks from scripting language code to threads at runtime. The medium holds instructions for accessing scripting language code that references a separate collection of code. The collection of code is associated with at least one annotation. The medium also holds instructions for executing the scripting language code in a computing environment that includes multiple threads. The medium additionally holds instructions for examining the annotation associated with the collection of code based on the executing of the scripting language code and holds instructions for selecting one of the threads based on the examining of the annotation. The medium further holds instructions for dynamically dispatching a first task associated with the execution of the collection of code to the selected thread at runtime.

In another embodiment, a method for dynamically dispatching tasks from scripting language code to threads at runtime associates at least one annotation with a collection of code. The annotation includes information about the execution of a first task associated with the execution of the collection of code. The method also accesses scripting language code that references the collection of code and executes the scripting language code in a computing environment that includes a plurality of threads. The method further examines the annotation(s) associated with the collection of code based on the executing of the scripting language code and selects one of the threads based on the examining of the annotation. The method also dynamically dispatches the first task to the selected thread at runtime.

In an embodiment, a system in a computing device for annotating code to allow the dynamic dispatching of tasks from scripting language code to threads at runtime. The system includes scripting language code. The system also includes annotation examination module that is used to examine at least one annotation associated with a collection of code during execution of the scripting language code. The system further includes a decision module that is used to dynamically dispatch a first task to a first selected thread automatically from the scripting language code, the dispatching occurring at runtime based on the examining of the annotation. The system includes a display device to present a user interface, the user interface allowing a user to enter an annotation for the collection of code.

In an embodiment, a computer-readable medium for use in a distributed computing system holds computer-executable instructions for dynamically dispatching tasks from scripting language code to distributed threads at runtime, the computer-readable medium holding instructions for associating at least one annotation with a collection of code, the at least one annotation used in dynamically dispatching tasks from the scripting language code to the threads at runtime. The medium further holds instructions for accessing scripting language code that references the collection of code. The medium additionally holds instructions for executing the scripting language code in a distributed computing environment that includes multiple computing devices and holds instructions for examining at least one annotation based on the executing of the code written in the scripting language. The medium also holds instructions for dynamically dispatching a first task to a first selected thread running on a first computing device and a dispatching a second task to a second selected thread running on a second computing device. The first and second tasks are associated with the collection of code and dispatched automatically from the scripting language code at runtime, the dispatching based on the examination of the at least one annotation.

BRIEF DESCRIPTION OF THE DRAWINGS

The accompanying drawings, which are incorporated in and constitute a part of this specification, illustrate one or more exemplary embodiments and, together with the description, explain embodiments of the present invention. In the drawings.

FIGS. 2A-2C depict exemplary displays of code that include annotations where the code can be displayed to a user via a display device;

FIGS. 11A-11C depict portions of annotated code analyzed by a thread analysis tool that can be displayed to a user via a display device;

FIG. 14 illustrates an exemplary algorithm used to detect thread mismatches at compile-time;

DETAILED DESCRIPTION

Definitions

Figure 1:
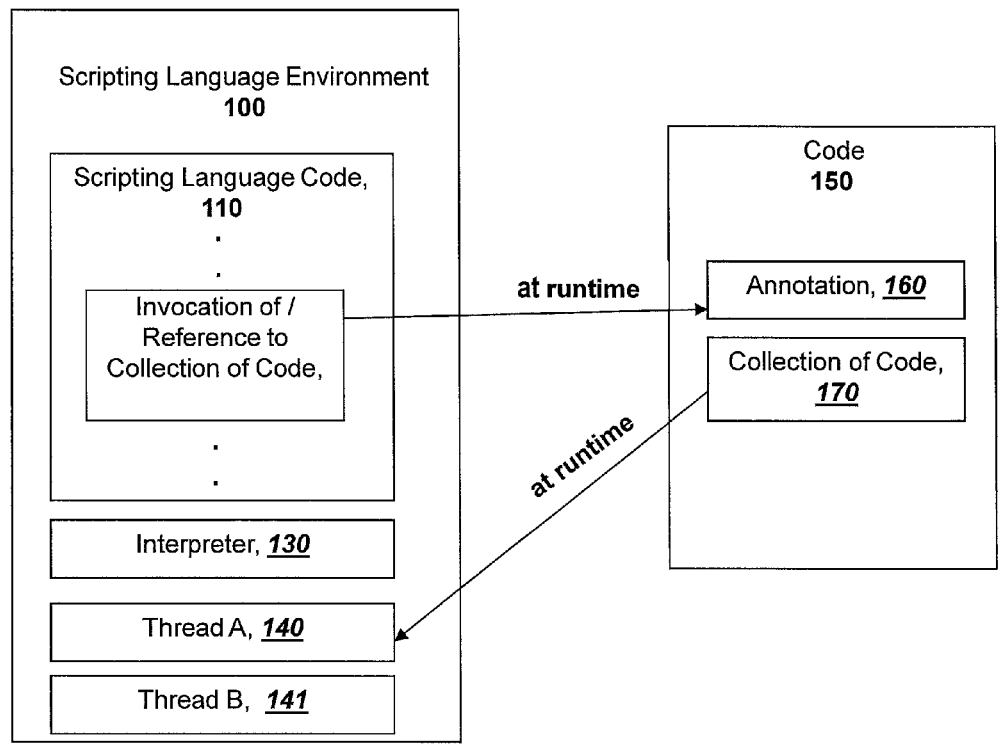
FIG. 1 depicts an exemplary embodiment that dynamically dispatches code at runtime to a particular thread for execution based on an annotation.

As used herein, the term "thread" is used to refer to an independently executing portion of a process. The thread may share resources with the process.

As used herein, the term "process" is used to refer to an instance of a computer program being executed. Processes may include one or more threads.

Use of Annotation Information for Runtime Dispatch of Tasks

Code written in a scripting language may include tasks that are executed at runtime. The scripting language may execute the tasks by dispatching them to a thread which will perform the task at runtime, in a procedure referred to as "thread dispatch of tasks." For example, one task may be dispatched to one thread, one task to multiple threads, multiple tasks may be dispatched to a single thread, or multiple tasks may be dispatched to multiple threads. The threads may execute tasks in the same scripting language, in a different scripting language or in a non-scripting language. Exemplary embodiments use code annotations in a scripting language or non-scripting language to characterize the preferred thread dispatching policy. For example, exemplary embodiments annotate code written in a scripting language to provide information relevant to thread dispatch (e.g. the name of the thread to which a particular task may be dispatched), etc. Exemplary embodiments may examine these code annotations and dispatch tasks in the code to appropriate threads at runtime. The code annotations thus help to ensure that tasks are executed by threads which are appropriate for the nature of the tasks.

A programming language environment may be running many types of threads and some of these threads may be configured for specific types of tasks. Similarly, tasks in the scripting language code may be configured for dispatch to specific threads. However, dispatching a task from scripting language code to an incompatible thread at runtime may result in exceptions, errors, freeze-ups, etc., in the execution of the code. For example, a time-consuming task dispatched to the JAVA event dispatch thread (EDT), instead of the JAVA background thread, may slow down a JAVA application or may make the application unresponsive. Similarly, a task that accesses a JAVA Swing component dispatched to a JAVA background thread, rather than the JAVA EDT, may result in an exception or error. Thus, numerous thread safety issues may result from mismatches between tasks and the threads to which the tasks are dispatched.

Software developers that write code, such as source code, may add information to the code that affects the operation of the code. For example, a software developer may add annotations to source code in the form of comments. The annotations may be manually added to the source code by the developer or may be programmatically added via an annotation module. These annotations may not affect the working of the program but may be used to provide instructions to a user reviewing the source code. Alternatively, these annotations may provide instructions to an interpreter or compiler when the source code is interpreted or compiled, respectively. For example, in an exemplary embodiment, code that executes a task may be annotated with threading information. The threading information in the annotation may be examined by a dispatcher module at runtime to identify the thread to which the task should be dispatched. In contrast, existing mechanisms for executing scripts may not employ threading information in annotations of code for dispatching tasks to threads at runtime.

Exemplary embodiments allow scripts to include references to separate code that executes a task, such as, but not limited to, non-scripting language code. An annotation associated with the separate code can provide threading information that may be accessed at runtime by a dispatcher module to determine which thread in the computing environment should execute the task. For example, a MATLAB-based script that is executed may make a call to a JAVA-based method. The class definition for the JAVA-based method may include an annotation with threading information. The dispatcher module at runtime may either examine the class definition or compiled byte code to examine this threading information. This dispatch mechanism allows a programmer writing or debugging scripts to utilize separate libraries of methods that are written in a different language while also exercising control over their manner of execution.

As noted above, in one exemplary embodiment, tasks annotated with threading information are examined at runtime and the tasks are dynamically dispatched to appropriate threads based on the threading information contained in the annotations. FIG. 1 depicts an exemplary embodiment dynamically dispatching code at runtime to a particular thread for execution based on an annotation. A scripting language environment 100 supports the execution of scripting language code 110. For example, scripting language environment 100 may support the execution of a MATLAB-based application or a software application compatible with a MATLAB-based application. The execution of the scripting language code 110 at runtime executes a reference to a collection of code 170 contained in separate code 150 (e.g.: a method/function call to a library method/function written in a separate programming language). Code 150 may be a collection of code written in a non-scripting language such as JAVA. An interpreter 130 for the scripting language environment 100 may interpret an annotation 160 associated with the invoked collection of code 170. For example, the interpreter 130 may dynamically examine an annotation associated with a JAVA class related to the invoked collection of code 170. Based on a pre-determined rule set for the annotation 160, the collection of code 170 may be dispatched at runtime to an appropriate thread for execution such as thread A (140) or thread B (141).

The following examples depicted in FIGS. 2A-2C show thread annotations that can be used in exemplary embodiments in the context of JAVA and MATLAB. However, exemplary embodiments are not limited to the context of JAVA and MATLAB.

FIG. 2A depicts a user interface 200 displaying a snippet of code including scripting language code 210 and a separate collection of code 220 that is written in a non-scripting language. For example, the scripting language code 210 may be MATLAB-based code and at 212 invoke a method called "doStuff" 222 that may be defined in a class in a collection of code 220 that is written in a non-scripting language, e.g. JAVA. Exemplary embodiments may provide an annotation 221 of the definition of doStuff that specifies that the doStuff method 222 should run on the Event Dispatch Thread (EDT) in JAVA. This annotation may be marked by an indicator such as the "@" character sign, where the @ character sign marks the presence of the annotation. At run-time, an interpreter for the scripting language may identify the "@" sign, examine the annotation 221 associated with doStuff 222, and may dynamically dispatch the task associated with doStuff to the Event Dispatch Thread in JAVA based on the annotation. Alternatively, the annotation may have been compiled into a JAVA byte code representation which is examined.

Similarly, FIG. 2B depicts a user interface 200 displaying scripting language code 230, e.g. MATLAB-based code, that at 232 invokes code called doOtherStuff. The method doOtherStuff 242 is defined in a collection of code 240 that may or not be written in the scripting language. An annotation 241 for doOtherStuff 242 in the collection of code 240 may read as "@RunOnMATLABThread" to specify that doOtherStuff should run on the MATLAB thread. At run-time, the interpreter executing the scripting language code may examine annotations associated with doOtherStuff 242, and may dynamically dispatch the task associated with doOtherStuff to the MATLAB thread in the computing environment. In an embodiment, the annotation 241 may also serve to dispatch the task associated with doOtherStuff to other threads besides the MATLAB thread by adjusting the details of the annotation so that the annotation contained information about a different thread.

In another example depicted in FIG. 2C, a user interface 200 displaying scripting language code 250, e.g. MATLAB-based code, that at 252 invokes code (e.g. a method) called MATLABInternalNonAccessibleMethod 262 that is defined in a collection of code 260 that may or may not be written in a scripting language. An annotation 261 associated with the collection of code 260 may specify that MATLABInternalNonAccessibleMethod 262 should not be accessible by the dispatcher module (by reading "@NoDispatcherModuleAccess". At run-time, the interpreter for the scripting language may examine annotations associated with MATLABInternalNonAccessibleMethod 262, and may prevent the dispatcher module from accessing the task.

It will be appreciated that the above three examples are illustrative and not exhaustive, and that many other types of annotations can be used within the scope of the present invention. For example, in an embodiment the details of the annotations may vary so long as the annotations are implemented in a format that can be understood by the interpreter for the scripting language.

Figure 3:
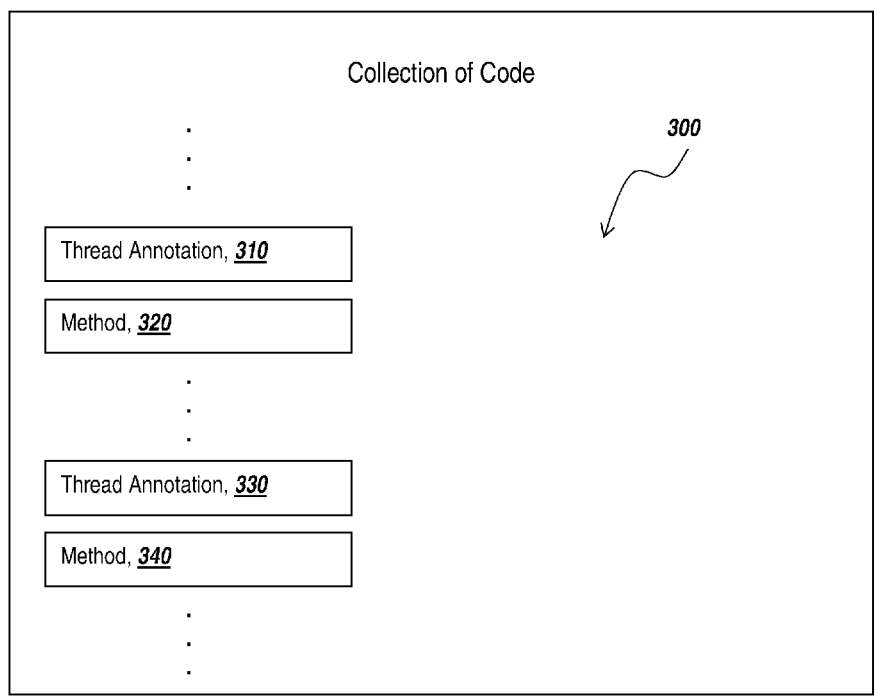
FIG. 3 illustrates an exemplary annotated collection of code.

FIG. 3 illustrates an exemplary annotated collection of code. The collection of code 300 may be written in a scripting or a non-scripting language. The annotation module may annotate the collection of code 300 with thread annotations 310 and 330. The collection of code 330 may include methods 320 and 340. An annotation module may annotate method 320 with thread annotation 310, and method 340 may be annotated with thread annotation 330. Thread annotations 310 and 330 may be dynamically examined at runtime in order to determine an appropriate thread to which the annotated collection of code is dispatched.

Figure 4:
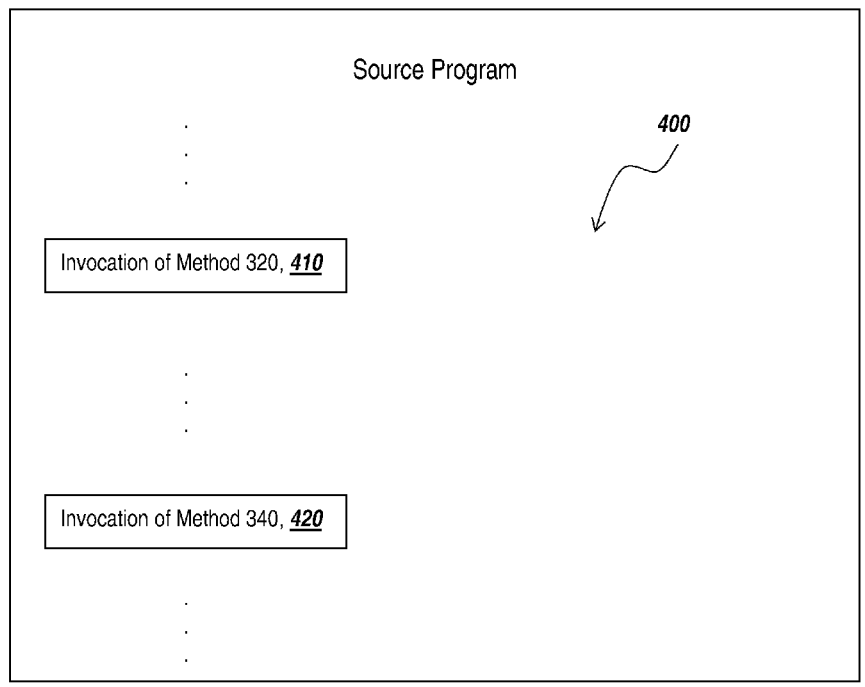
FIG. 4 illustrates an exemplary source program written in a scripting language that can be used with an exemplary embodiment.

FIG. 4 illustrates an exemplary source program 400 written in a scripting language. Source program 400 may be created in scripting language environment 100. Source program 400 may include a method invocation 410 to invoke method 320 in collection of code 300. Source program 400 may also include a method invocation 420 to invoke method 340 in collection of code 300. Methods 320 and 340 may be invoked and/or executed when the scripting language interpreter interprets source program 400. Exemplary embodiments may dynamically dispatch tasks associated with methods 320 and 340 to appropriate threads at runtime for the execution of the tasks based on thread annotations associated with the methods.

Figure 5A:
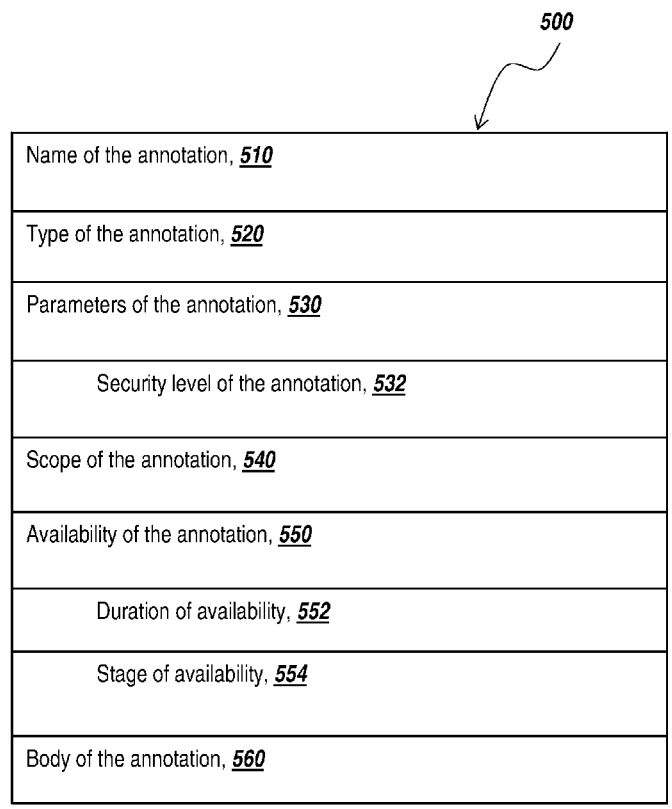
FIG. 5A illustrates the structure of an exemplary annotation for a collection of code.

FIG. 5A illustrates an exemplary structure of an annotation for a collection of code. Annotation 500 may include a name 510 that identifies a particular annotation and/or a type 520 specifying a category of the annotation. In one embodiment, type 520 can identify a broad category for the annotation, such as, but not limited to, threading policy, performance, security, etc. Annotation 500 may include additional parameters 530, that can include security level 532 (e.g. high, medium, low). Annotation 500 may also include information on its scope 540 (e.g. package, class, method, field). Annotation 500 may further include information on its availability 550. In one embodiment, availability information 550 may include one or more fields, such as duration of availability 552 and stage of availability 554 (e.g. at runtime, at compile-time). Additionally, annotation 500 may include the actual body of annotation 560 which may include information on threading policy, performance, security, etc. Annotation 500 is not limited to the fields identified in connection with FIG. 5A. In other embodiments, annotation 500 may include additional fields, fewer fields, and/or fields shown in an arrangement that differs from the arrangement of FIG. 5A.

Annotation 500 may pertain to threading, performance and/or security of the associated collection of code. Thread annotations may specify the identity of one or more threads to which a task may be dispatched (e.g. Event Dispatch Thread in JAVA, main MATLAB thread, etc). Thread annotations may also specify an identity of one or more threads to which the task may not be dispatched. Thread annotations may also specify one or more threads that may not have access to the task. Thread annotations may also specify a priority of a task (e.g. high, medium, low), and/or may specify whether the dispatch of the task should occur in parallel or in sequence with the dispatch of other tasks.

Performance annotations may specify memory size, disk size, throughput, network bandwidth, peripheral device existence, floating point unit (FPU) operations, etc, associated with the execution of the task. Security annotations may specify an identity of entities that may access the task (e.g. root, group, user). Security annotations may also specify task operations to which each entity may have access (e.g. read, write, execute operations).

Figure 5B:
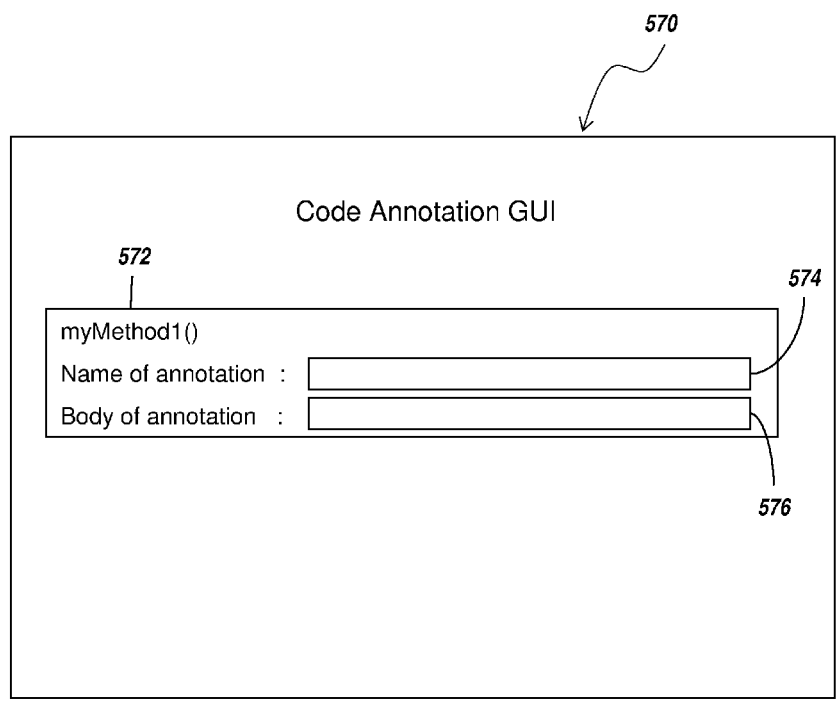
FIG. 5B illustrates an exemplary graphical user interface (GUI) used for annotation of a collection of code.

FIG. 5B illustrates an exemplary graphical user interface (GUI) 570 that may be used to annotate a collection of code. The collection of code may include code such as a method called myMethod1. A section 572 of the GUI 570 may be used to annotate myMethod1. Section 572 of the GUI may include a field 574 for entering the name of the annotation, and a field 576 for entering the body of the annotation.

Figure 6:
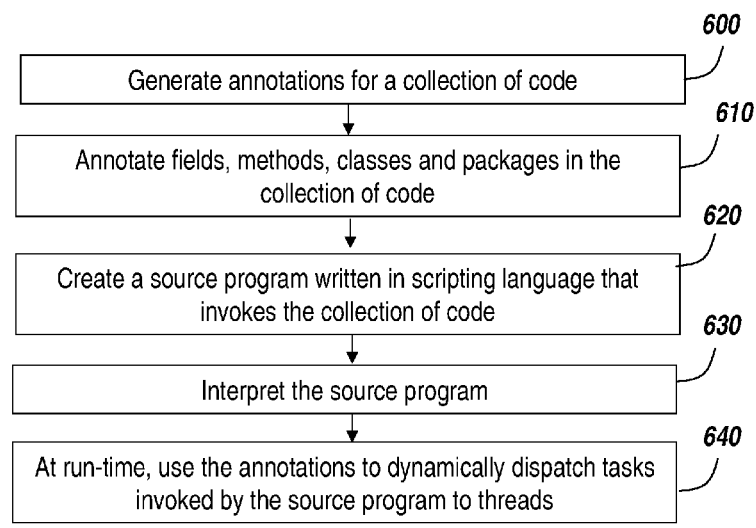
FIG. 6 illustrates a flowchart depicting exemplary processing to practice an exemplary embodiment.

FIG. 6 illustrates a flowchart depicting processing acts (or steps) that can be used to practice an exemplary embodiment. In step 600, a software developer or the annotation module may generate annotations 160 for a collection of code 170 written in a scripting or a non-scripting language. For example, the annotation module may generate annotations 160 for a collection of code 170, such as a method, a class, etc. The annotations 160 may specify instructions on threading, performance and/or security associated with the collection of code 170. In one embodiment, the annotation module may automatically generate the annotations 160 based on an examination of the type of tasks embodied in the collection of code 170. In another embodiment, annotation module may present the user with a dialog box, upon the creation of a collection of code 170, to prompt the user to enter annotations 160 associated with the collection of code. The user may also select a menu-item in order to be presented with the dialog box. In another embodiment, a software developer authoring a collection of code 170 may add annotations 160 to code as part of the development process.

In step 610, the annotation module may annotate the collection of code 170 with annotations 160 generated in step 600. The annotations 160 may be applied to different entities within the collection of code 170. For example, the annotations 160 may be used for a field, a method, a class, or a package within the collection of code 170. Annotations of different scopes may be used to specify different threading policies for the different entities in the collection of code 170. In step 620, a scripting environment may create a source program, i.e. a script, which invokes the collection of code 170. In step 620, an interpreter 130 in the scripting language environment 100, may interpret the source program. During this interpretation, i.e. at runtime, the interpreter 130 may reach a portion of the source program that invokes the annotated collection of code 170. Executing the annotated collection of code 170 is a task that may be dispatched to a thread 140 or 141. In one embodiment, the interpreter 130 may directly interpret the annotations 160 as it encounters the annotations in the script (step 630). In another embodiment, the interpreter 130 may delegate the task of interpreting the annotations 160 to a different module on a computing device. In step 640, exemplary embodiments use annotations 160 associated with the collection of code 170 to dynamically dispatch the task to an appropriate thread 140 or 141.

Figure 7:
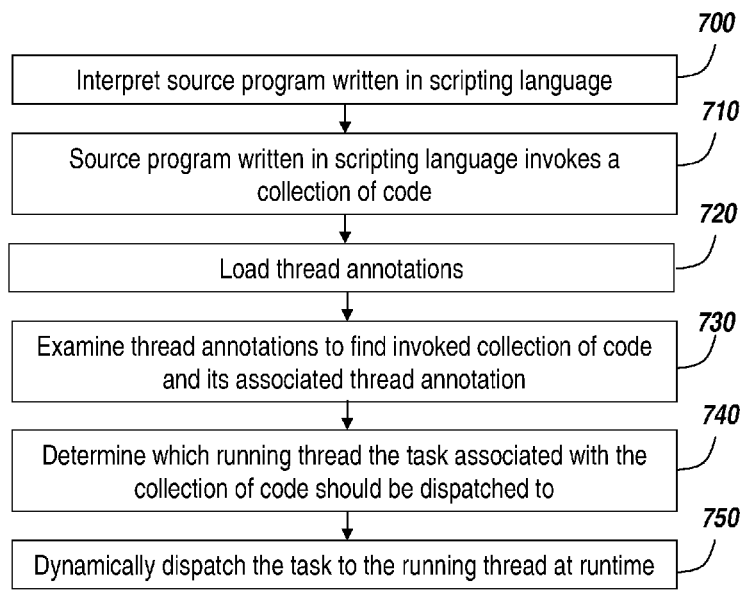
FIG. 7 illustrates a flowchart depicting exemplary processing to dynamically dispatch tasks to threads at runtime using an exemplary embodiment.

The dynamic dispatch of tasks utilizing threading information from annotations is further depicted in FIG. 7 which illustrates a flowchart of exemplary processing performed to dispatch tasks to threads at runtime. In step 700, the scripting language interpreter interprets a source program. In step 710, a portion of the source program may invoke a portion of a collection of code, which may or may not be written in a scripting language. In step 720, an annotation examination module may load annotations associated with the collection of code or a subset of the code. In step 730, the annotation examination module may examine the annotations to find the invoked portion of collection of code, and its associated thread annotation. In step 740, a decision module may determine which thread to dispatch the invoked task to based on the annotation. In step 750, the decision module may dynamically dispatch the task to the appropriate thread at runtime.

Figure 8:
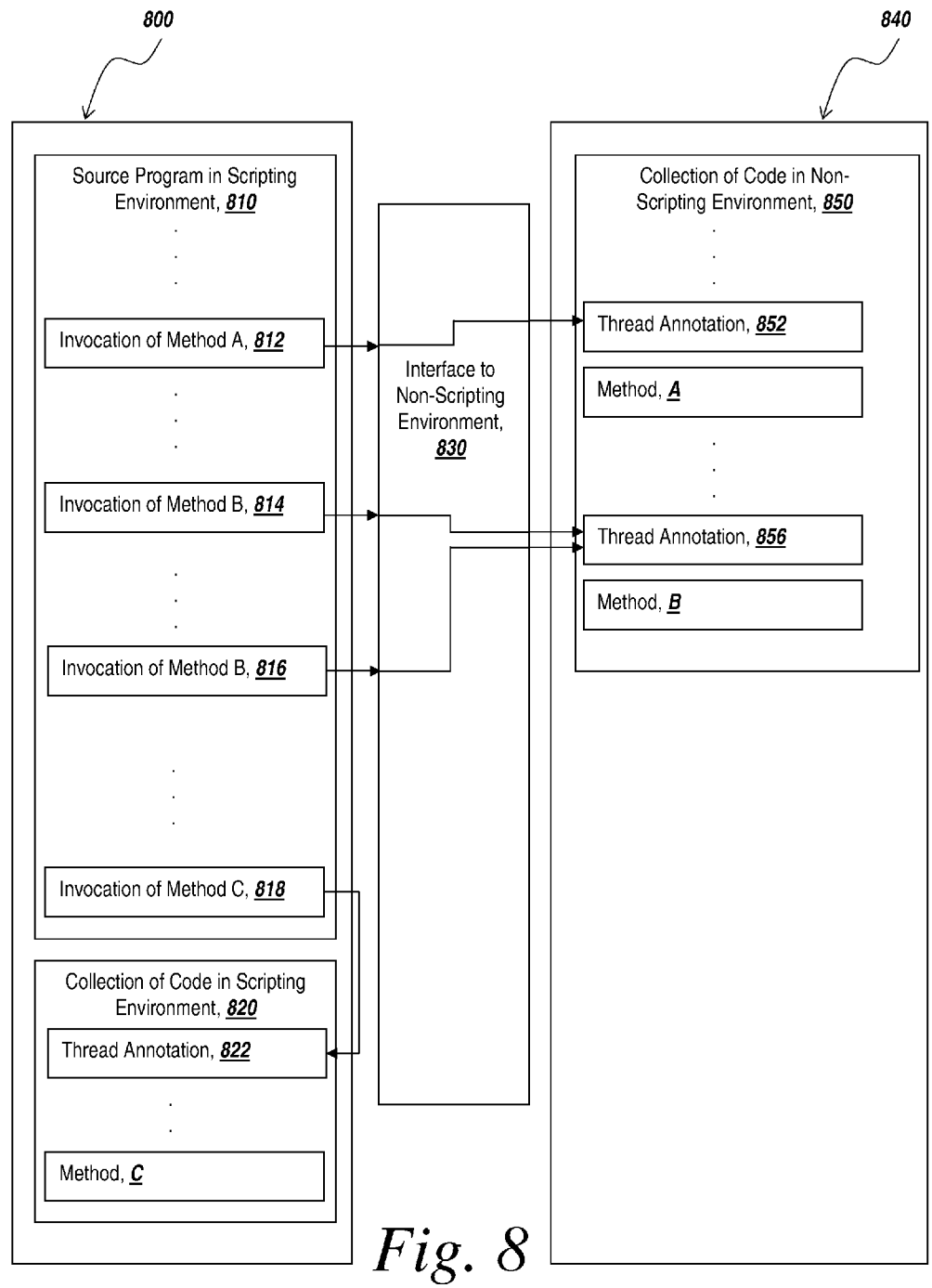
FIG. 8 illustrates an exemplary source program written in a scripting language that executes methods written in a scripting language and in a non-scripting language.

FIG. 8 illustrates an exemplary source program 810 written in a scripting language. Source program 810 invokes code such as functions/methods written in the scripting language and in a non-scripting language. A scripting environment 800 may include a source program 810 and a collection of code 820. A non-scripting environment 840 may include a collection of code 850. An interface 830 may exist between scripting environment 800 and non-scripting environment 840. Interface 830 may be a hardware interface or alternatively may be a software interface through which the script language interpreter can access the collection of code in non-scripting environment 850. Collection of code 820 in scripting language 800 may include a method "C" that has an associated thread annotation 822. Collection of code 850 in non-scripting language 840 may include methods A and B with associated annotations 852 and 856, respectively.

Source program 810 in scripting environment 800 may include four method invocations: method invocation 812 that invokes method A, method invocations 814 and 816 that invoke method B, and method invocation 818 that invokes method C. Other embodiments of source program 810 may include more or fewer method invocations. An annotation examination module may examine the annotations associated with the invoked methods when the script language interpreter interprets source program 810. In one embodiment, when the script language interpreter interprets source program 810, thread annotation 822 may be examined within scripting environment 800. The examination of thread annotations 852 and 856 in non-scripting environment 840 may occur though interface 830. Based on the examination of thread annotations 852 and 856, a decision module may select a thread to which each invoked task should be dispatched.

Figure 9:
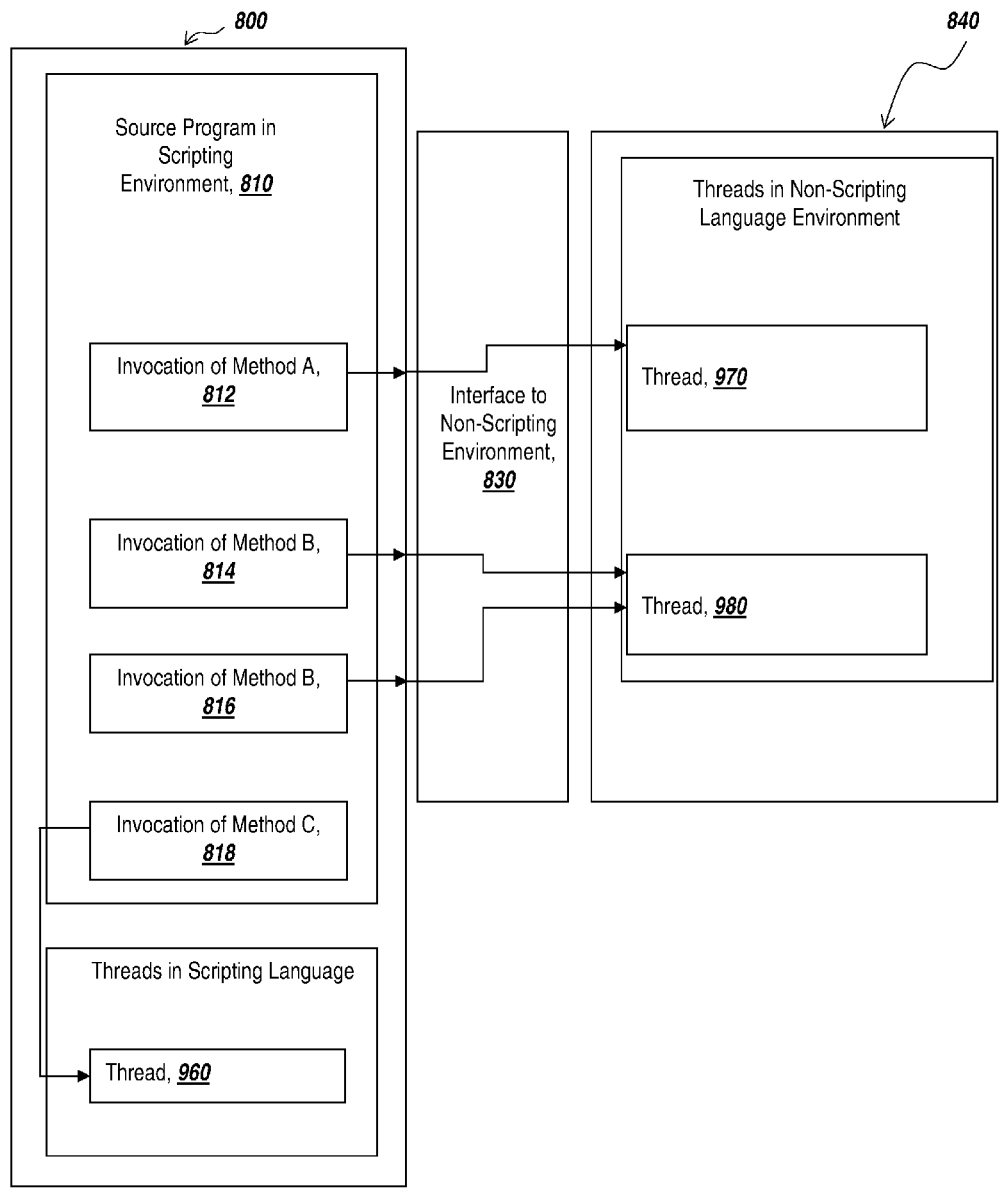
FIG. 9 illustrates an exemplary source program written in a scripting language that dynamically dispatches tasks to threads at runtime.

Similarly to FIG. 8, FIG. 9 illustrates in further detail an exemplary source program written in a scripting language that dynamically dispatches tasks to threads at runtime. A decision module may determine that invoked method C may be dispatched to thread 960 running in scripting environment 800. As an example, in scripting environment 800, MATLAB thread 960 may be the main MATLAB thread. Exemplary embodiments may then dynamically dispatch the task associated with invoked method C to thread 960 at runtime.

For example, a decision module may also determine that invoked method A may be dispatched to thread 970, and invocations of method B (814 and 816) may be dispatched to thread 980. As an example, in non-scripting language environment 840 JAVA, threads 970 and 980 may be the Event Dispatch Thread (EDT) and the JAVA background thread, respectively. The invocation of method A (812) may cause a real-time graphical manipulation in a JAVA graphical user interface (GUI) to be performed, and may need to be handled by the JAVA EDT. The invocation of methods B (814) and 860 (816) may perform time-consuming but non-urgent functions, and thus can be handled by the JAVA background thread 970. Exemplary embodiments prevent thread mismatch issues and ensure smooth execution of the source program by dynamically dispatching invoked methods to appropriate threads at runtime.

Figure 10:
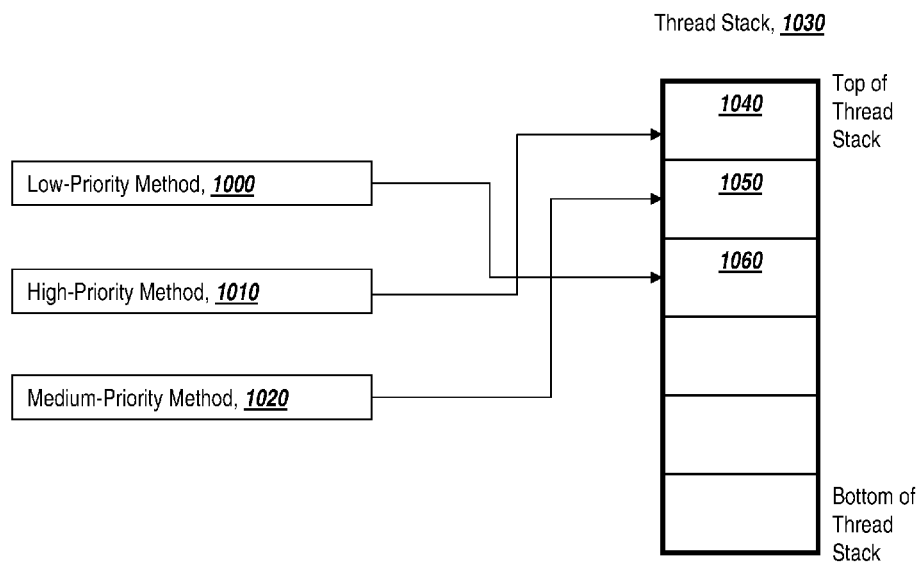
FIG. 10 illustrates an exemplary technique for dispatching of multiple tasks to the same thread.

FIG. 10 illustrates an exemplary technique for dispatching multiple tasks to the same thread. As described in connection with FIG. 9, more than one task may be dynamically dispatched at runtime to the same thread. Each thread may receive its own thread stack space in memory. Tasks dispatched to the thread may be placed in the thread stack on a last-in first-out or other ordering scheme. The order in which tasks are dispatched to a thread stack may depend on the priority of the tasks. For example, tasks 1000, 1010 and 1020 may be dispatched to a thread stack 1030. High-priority task

1010 may be placed at the first position 1040 of thread stack 1030. Medium-priority task 1020 may be placed at the second position 1050 of thread stack 1030. Low-priority task 1000 may be placed at the third position 1060 of thread stack 1030. In another embodiment, the dispatch ordering may depend on factors other than task priority such as the time of arrival of the task in the thread stack. This dispatch ordering may be determined automatically in one embodiment or may be delegated to a separate module in another embodiment.

Static Analysis Tool

Conventional programming languages may have compilers that are unable to detect thread safety issues at compile-time. As a result, software developers may discover threading issues only at runtime. Since runtime errors may occur long after the development of the software, this conventional approach may be costly and inefficient. For example, the compiler in the JAVA programming language may be unable to catch thread safety issues at compile-time. This is because SWING, JAVA's primary user interface library, is not thread-safe by design. Since a significant number of JAVA threading issues may appear sporadically and may be hidden from the developer due to their dependency on machine hardware, processor, or load, software designers may be unable to detect these errors early in a code development cycle.

Iterative detection of threading issues at runtime and their subsequent debugging in the software is a time-consuming and inefficient process. Exemplary embodiments provide a thread safety analysis tool that allows software developers to detect threading issues at compile-time. The term "compile-time" as used herein refers to a time before the software is executed, run or deployed. The thread safety analysis tool may include a set of thread policy conventions which are a set of rules regarding the thread dispatch policies of tasks. In one embodiment, these conventions may be written using JAVA 5 annotations. The thread safety analysis tool may also include a parser that traverses source code and/or compiler output (e.g., byte code) to detect threading issues. In one implementation, the parser may traverse JAVA class files and inspect JAVA byte code instructions.

As noted above, a software program may include different collections of code, e.g. fields, methods, classes and packages. Each collection of code may be designed to run only on a particular thread, specified by an associated thread annotation. A first collection of code running on a first thread may invoke a second collection of code that may run only on a second thread. A threading issue may arise when the first and second thread policies do not match. The thread safety analysis tool may be used to identify such thread policy mismatches at compile time. FIGS. 11A-11C depict examples of threading issues identified by the static analysis tool.

In FIG. 11A, a first collection of code 1110 includes a first method mymethod 1112 that has a thread policy (MainThreadPolicy) indicated by an annotation 1111. The first method mymethod 1112 calls a second method myeventmethod 1222 in a separate collection of code 1120. The method myeventmethod also has a thread policy (EventThreadPolicy) indicated by an annotation 1121. The thread safety analysis tool examines thread annotations of the two methods and looks up a set of thread policy conventions. The thread safety analysis tool determines that the two thread policies differ and therefore should not interact. The thread safety analysis tool detects the threading issue for code being compiled and outputs an error message. For example, the error message may be output to a display 1100 which displays the error message 1130 to a user. Alternatively, the error message may be output to a log file. In one implementation, the display may also show the interacting collections of code such as the collections of code 1110 and 1120 shown in FIG. 11A.

The thread safety analysis tool may further identify threading policy mismatches for code entities other than methods. In FIG. 11B, a collection of code 1140 defines a field fFOO 1142 has been annotated 1141 to indicate that that there is a thread policy (MainThreadPolicy) associated with the field. A method myeventmethod 1152 in a second collection of code has been annotated 1151 to indicate that it has a different thread policy, EventThreadPolicy. The code myeventmethod 1152 includes code that calls 1153 the field fFOO 1142. The thread safety analysis tool determines that the field and the calling method should not interact because of the difference in thread policy. The thread safety analysis tool may output an error message 1160 on a display 1100. As in the previous example, the display 1100 may also show the collections of code 1140 and 1150 for the code entities (i.e. field and method calling the field in this example) involved in the thread mismatch.

In another example depicted in FIG. 11C, a method mymethod 1172 in a collection of code 1170 has been annotated 1171 to indicate that it has a thread policy (MainThreadPolicy). The code for mymethod 1172 calls a constructor JButton 1173. The thread analysis safety tool looks up a set of thread policy conventions and identifies that JButton utilizes the JAVA SWING library and therefore has an event thread policy. The thread safety analysis tool determines that the thread policies differ for mymethod 1172 and the JButton constructor 1173 and that they therefore should not interact 1180.

Since the exemplary embodiments identify threading issues at compile-time, code development cycles may be shorter and less costly as compared to conventional techniques that cannot detect threading issues until runtime. It should be appreciated that the types of threading issues detectable by exemplary embodiments are not limited to the examples set forth above.

Conventional techniques examine a limited subset of execution paths at compile time. In contrast, the thread safety analysis tool may test all possible execution paths in the software at compile-time. The use of the thread safety analysis tool means that the execution of the software is not required for the detection and debugging of threading issues. As a result, the programming language need not be started for debugging, which reduces the time and resource usage taken in the threading debugging process. The more streamlined debugging process enables a software developer to fix and improve code quickly with the thread safety analysis tool.

Figure 12:
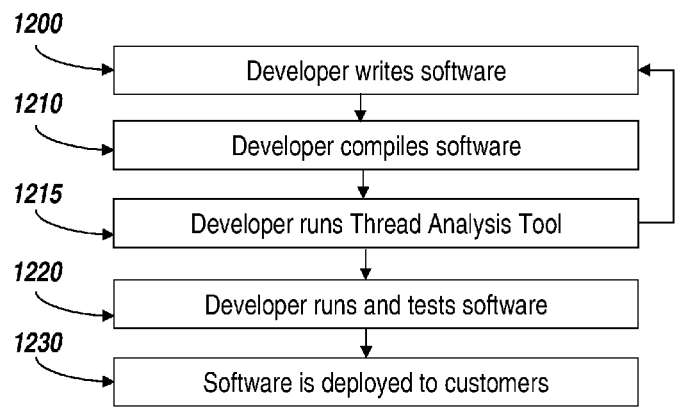
FIG. 12 illustrates a flowchart depicting exemplary processing activities performed in a software development process according to exemplary embodiments.

FIG. 12 illustrates a flowchart depicting a software development process according to exemplary embodiments. In step 1200, a software developer may write software in accordance with functionality and performance requirements for the software. For example, the software may be developed based upon a specification that the developer may transform into code. In step 1210, the developer compiles the software to begin a testing and debugging phase of the software development process. In step 1215, the developer may run the thread safety analysis tool. For example, a developer may run the thread safety analysis tool prior to testing the software. The thread safety analysis tool may detect threading issues at compile-time. The thread safety analysis tool may use an annotation examination module to examine the annotations associated with the software. A decision module may compare the annotations with thread policy conventions to detect thread policy mismatches. Any threading issues may be reported to the developer, in one embodiment, through a user interface. Steps 1200-1215 may be repeated for iterative testing of the software. The developer may run and test the software in step 1220 when threading issues are resolved. In one embodiment, the software may be run when all threading issues are resolved. In another embodiment, the software may be run when a subset (e.g. critical issues) are resolved. When threading issues are resolved, the software may be deployed to customers in step 1230. In an exemplary embodiment, all threading issues may be detected at compile-time, which may prevent threading issues from arising at run-time or after software deployment. In another embodiment, threading issues may be detected at compile-time (e.g., code meeting a certain threading criteria). These detection techniques may provide time and/or cost savings in detecting threading issues as compared to conventional threading issue detection techniques.

Figure 13:
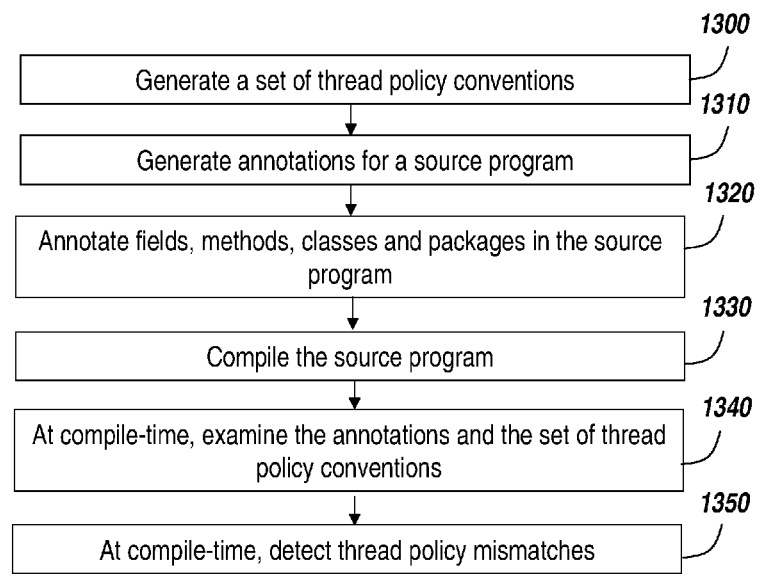
FIG. 13 illustrates a flowchart depicting an exemplary use of a thread safety analysis tool.

FIG. 13 illustrates a flowchart depicting an exemplary use of the thread safety analysis tool during the design process discussed above in FIG. 12. In step 1300, exemplary embodiments may generate a set of thread policy conventions. In step 1310, an annotation module may generate annotations for a collection of code written in a scripting or a non-scripting language. The annotations may specify threading, performance, security policies, etc. associated with the collection of code. In one embodiment, an annotation module may automatically generate annotations based on an examination of the type of task embodied in collection of code. In another embodiment, an annotation module may automatically present the user with a dialog box when a collection of code is created to prompt the user to enter annotations associated with the collection of code. The user may also select a menu-item in order to be presented with the dialog box. It should be appreciated that exemplary embodiments are not limited to the aforementioned mechanisms of generating annotations for a collection of code, and that other mechanisms can be used without departing from the spirit and scope of the invention.

In step 1320, an annotation module may annotate the collection of code with the annotations produced in step 1310. Produced annotations may have a scope associated therewith. For example, the annotations have a scope that may be a field, a method, a class, a package within the collection of code, etc. Separate annotations may be used to specify different thread policies for the different methods in the collection of code.

In step 1330, the compiler may compile the source program. During compilation, i.e. at compile-time, the compiler reaches a portion of the source program that invokes the annotated collection of code. Execution of the annotated collection of code is a task that may be dispatched to a thread. Accordingly, in step 1340, an annotation examination module 128 may examine the annotations and the set of thread policy conventions 144. In step 1350, exemplary embodiments may detect thread policy mismatches between the invoked collection of code and the calling portion of the source code. It will be appreciated that the order of steps 1340 and step 1350 may be reversed in alternate embodiments.

FIG. 14 illustrates an exemplary algorithm that can detect thread mismatches at compile-time. At compile-time, exemplary embodiments may compile source code that invokes other collections of code. For example, an annotation examination module may loop through a set of classes in the source code, e.g. loop through a set of JAVA classes, loop 1 (1400). Within each class, the annotation examination may loop through each method in the class, loop 2 (1410). For each method, the annotations may be examined to determine the threading policy of the method, (1412). If a threading policy is not defined for the method, the threading policy for the method's defining class may be loaded, 1414. If a threading policy is not defined for the method's defining class and if the defining class is an inner class or an anonymous class, the threading policy for the parent owning class may be loaded, 1416. Alternatively, if a threading policy is not defined, the thread analysis tool may throw an error or warning to the user notifying them of inadequate thread policy information.

After a threading policy has been loaded for the method, the annotation examination module may loop through all of methods and fields invoked by the method, loop 3 (1420). This may be performed by reading instructions in the byte code file including the methods and fields. For each invoked method or field, the annotations may be examined to determine the threading policy of the invoked method or field, 1422. The threading policies of the invoked method/field and the calling method may then be examined in view of the set of thread policy conventions. If the threading policy of the invoked method or field is not compliant with the threading policy of the calling method (as set forth in the set of thread policy conventions), a thread mismatch error may be thrown 1424, and an indication of the error displayed to the user via a user interface. Although the example discussed in FIG. 14 specifically discusses an algorithm for examining thread policies associated with a method, it should be understood that the same type of algorithm may also be used to examine policies associated with functions, code blocks, fields, etc.

Figure 15A:
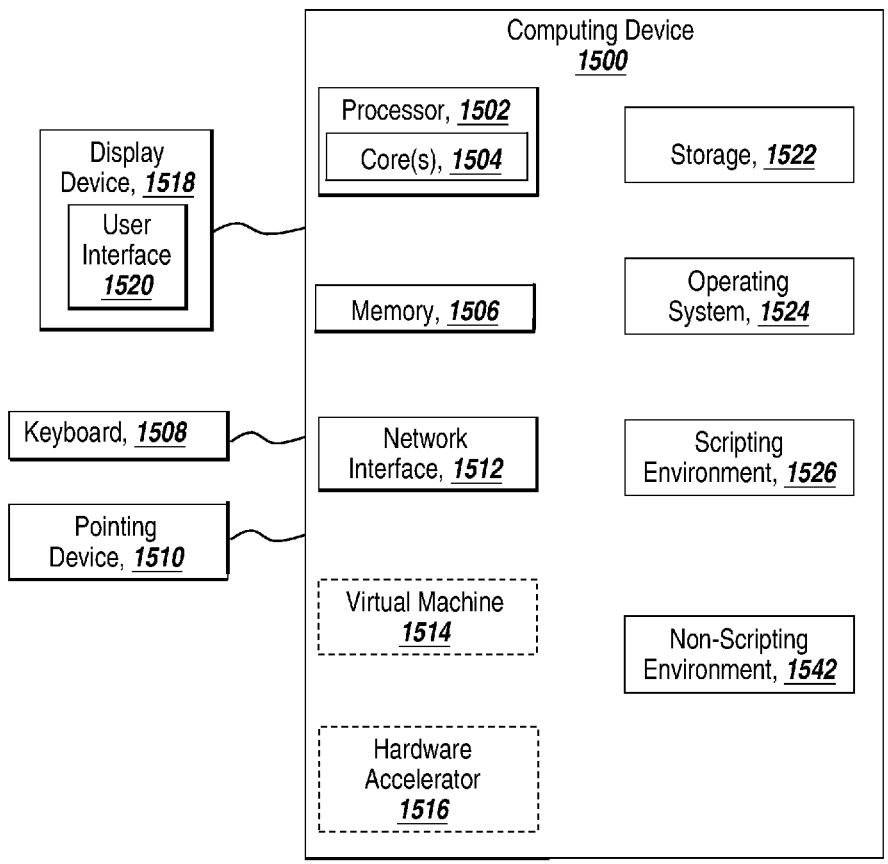
FIG. 15A illustrates an exemplary computing device suitable for practicing exemplary embodiments.

FIG. 15 depicts a computing device 1500 suitable for practicing an exemplary embodiment. The computing device 1500 may include one or more processor(s) 1502 for executing software stored in the memory 1506, and other programs for controlling system hardware. One or more processor(s) 1502 may each be a single core processor or multiple core processor 1504. The computing device 1500 may be any type of computer system such as a workstation, desktop computer, server, laptop, handheld computer or other form of computing or telecommunications device that is capable of communication and that has sufficient processor power and memory capacity to perform the operations described herein.

The computing device 1500 may be running substantially any operating system such as a version of the Microsoft® Windows® operating systems, Unix operating system, Linux operating systems, MacOS® operating system, etc. Implementations of computing device 1500 may further operate an embedded operating system, a real-time operating system, an open source operating system, a proprietary operating system, an operating system for mobile computing devices, and/or another type of operating system capable of running on computing device 1500 and performing the operations described herein.

Memory 1506 may include a computer system memory or random access memory such as dynamic random access memory (DRAM), static random access memory (SRAM), magnetoresistive random access memory (MRAM), extended data out random access memory (EDO RAM), flash memory, etc. The computing device 100 may include other I/O devices, for example a mouse, a motion based input device, and a camera, for receiving input from a user. A user may interact with the computing device 1500 through a keyboard 1508, and a pointing device 1510. In addition, the user may use a display device 1518 (such as a computer monitor), to interact with the computing device 1500 where display device 1518 may include a user interface 1520.

Additionally, computing device 1500 may include a network interface 1512 providing an interface between computing device 1500 and a communication medium, such as a network. Network interface 1512 may include a built-in network adapter, network interface card, Personal Computer Memory Card International Association (PCMCIA) network card, Card Bus network adapter, wireless network adapter, Universal Serial Bus (USB) network adapter, modem or any other device suitable for interfacing the computing device 1500 to any type of communication medium capable of communication and performing the operations described herein.

Virtualization may be employed in computing device 1500, to, for example, dynamically share infrastructure and resources while giving the appearance of a single logical computing resource. For example, a virtual machine 1514 may be provided to handle a process running on multiple processors so that the process appears to be using only one computing resource rather than multiple. Multiple virtual machines may also be used with one processor. Other computing resources, such as Field Programming Gate Array (FPGA), Application Specific Integrated Circuit (ASIC), Application Specific Instruction Processor (ASIP), Digital Signal Processor (DSP), Graphics Processing Unit (GPU), and General Purpose Processor (GPP), may also be used for executing code and/or software. A hardware accelerator 1516, such as implemented in an ASIC, FPGA, or the like, may additionally be used to speed up the general processing rate of the computing device 1500.

The computing device 1500 may further include a storage device 1522, such as a hard-drive, CD-ROM, or other computer readable medium, for storing an operating system 1524 and other related software, and for storing scripting environment 1526, such as a MATLAB-based programming environment. The storage 1522 may store instructions for a non-scripting environment 1542, such as a JAVA programming environment. The non-scripting environment 1542 may be used to create, edit, and/or execute appropriate software code and may be implemented as a virtual environment. The computing device 1500 may also include an annotation rule base 1548 that may hold all annotation rules and which may be consulted when interpreting annotations.

Figure 15B:
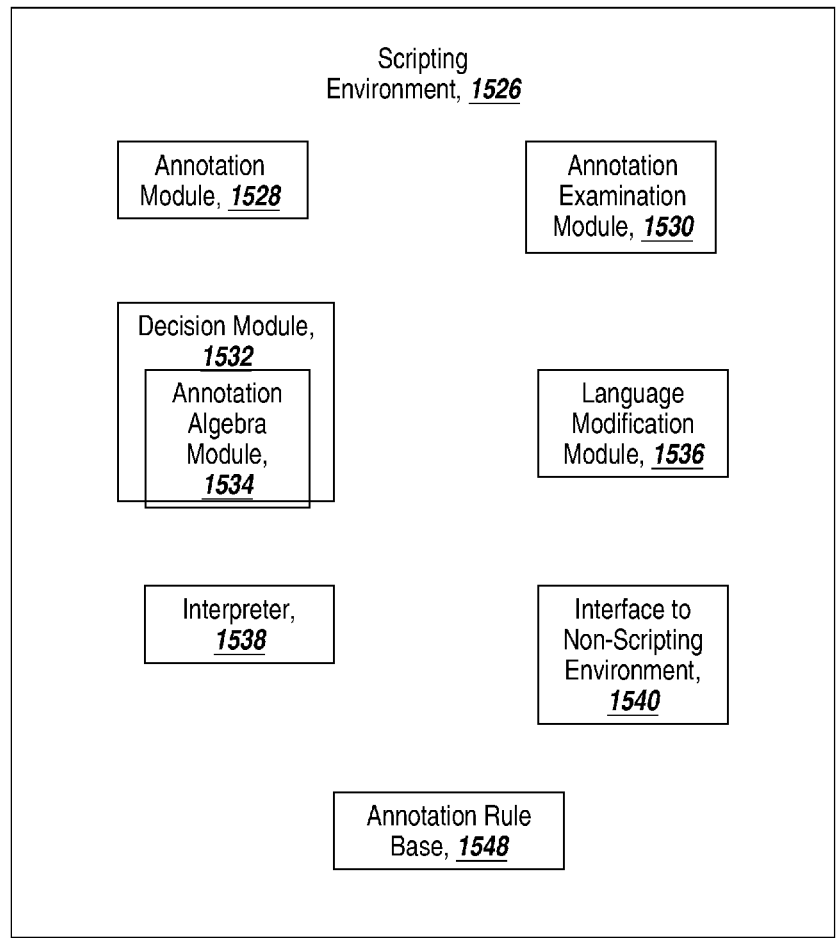
FIG. 15B illustrates the scripting environment of FIG. 15A in greater detail.

FIG. 15B depicts the scripting environment 1526 in greater detail. Scripting environment 1526 may be used to create, edit, and/or execute a software script. Scripting environment 1526 may include an annotation module 1528 that may be used to annotate a collection of code with information including, but not limited to, threading policy information, performance information and security information. Scripting environment 1526 may include an annotation examination module 1530 that may examine the annotation associated with a collection of code to extract annotation information. Scripting environment 1526 may include a decision module 1532 that may make thread dispatch decisions at runtime based on the results of the annotation examination module 1530. The decision module 1532 may also make other decisions regarding the collection of code, including, but not limited to performance and security decisions. The decision module 1532 may include an annotation algebra module 1534. When annotations associated with a collection of code contain more than one instruction, the annotation algebra module 1534 may perform algebra, such as Boolean algebra, on those instructions to identify a decision (e.g. a correct decision) that should be taken by decision module 1532 with respect to the collection of code.

Scripting environment 1526 may include a language modification module 1536 that may modify the scripting language running on scripting environment 1526 to declare a new type for the annotations. Scripting environment 1526 may include an interpreter 1538 to interpret a script written in a scripting language. Scripting environment 1526 may also include an interface 1540 to a non-scripting environment. Alternatively, an interface to the non-scripting environment may be located outside the scripting environment 1526.

Figure 16:
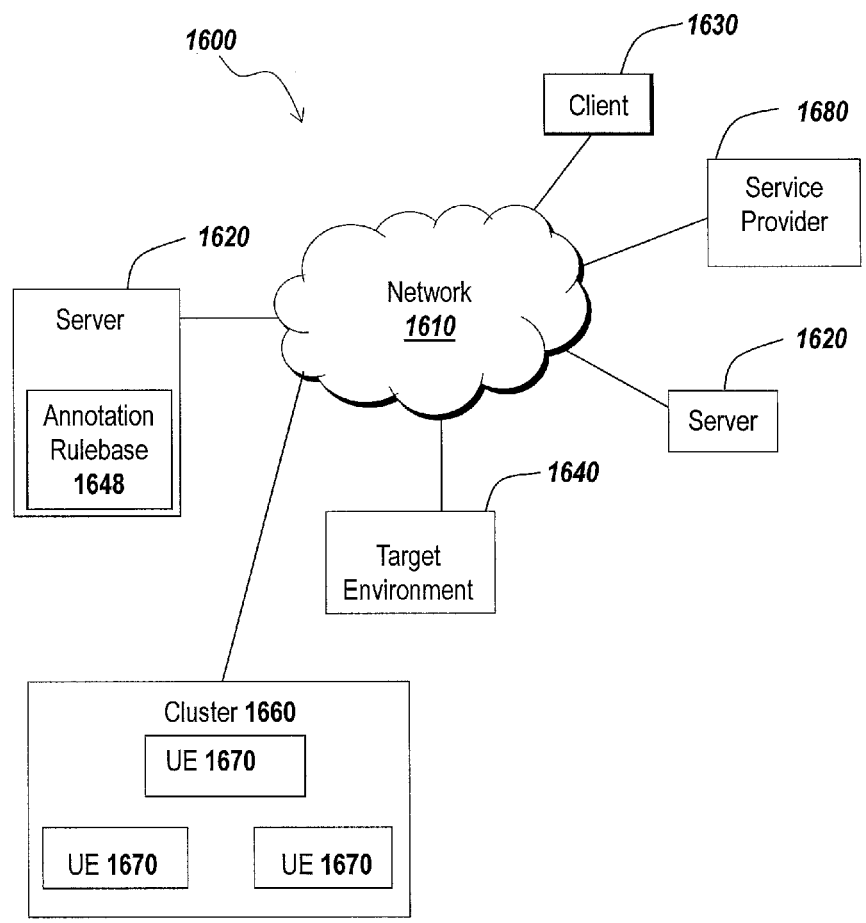
FIG. 16 is an exemplary network environment suitable for practicing distributed implementations of the exemplary embodiments.

FIG. 16 is an exemplary network environment 1600 (hereinafter environment 1600) suitable for processing distributed implementations of the exemplary embodiments. Environment 1600 may include one or more servers 1620 or other computing devices coupled to clients 1630 via a communication network 1610. In one embodiment, server 1620 may hold the annotation rule base 1648. In other embodiments, the annotation rule base 1648 may be included on the other servers or clients. In one implementation, servers 1620 and/or clients 1630 may be used with computing device 1500. The network interface 1612 of the computing device 1500 may enable the servers 1620 to communicate with the clients 1630 through the communication network 1610.

Communication network 1610 may be the Internet, intranet, Local Area Network (LAN), Wide Area Network (WAN), Metropolitan Area Network (MAN), wireless network (e.g., using IEEE 802.11, Bluetooth, etc.), etc. Communication network 1610 may use middleware, such as Common Object Request Broker Architecture (CORBA) or Distributed Component Object Model (DCOM) to allow a computer (e.g., server 1620) on communication network 1610 to communicate directly with another computer or device (e.g., client 1630) that is connected to communication network 1610. In addition, communication network 1610 may use Remote Method Invocation (RMI) or Remote Procedure Call (RPC) technology. RMI and RPC are exemplary technologies that allow functions, methods, procedures, etc., to be called over communication network 1610. For example, client 1630 may invoke code that resides remotely on the client 1640. Additionally, servers 1620 may provide clients 1630 with software components or products under a particular condition, such as a license agreement.

In an exemplary distributed implementation the communication network 1610 may transport data from a source to a destination. Embodiments of communication network 1610 may use network devices, such as routers, switches, firewalls, and/or servers (not shown) and connections (e.g., links) to transport data. "Data," as used herein, may refer to any type of machine-readable information having substantially any format that may be adapted for use in one or more networks and/or with one or more devices (e.g., computer, service provider, etc.). Data may include digital information or analog information. Data may further be packetized and/or non-packetized.

Communication network 1610 may be a hardwired network using wired conductors and/or optical fibers and/or may be a wireless network using free-space optical, radio frequency (RF), and/or acoustic transmission paths. In one implementation, communication network 1610 may be a substantially open public network, such as the Internet. In another implementation, communication network 1610 may be a more restricted network, such as a corporate virtual network. Implementations of networks and/or devices operating on networks described herein are not limited to any particular data type, protocol, architecture/configuration, etc.

The communication network 1610 may include a service provider 1680 that makes a service available to another device. For example, a service provider may include an entity (e.g., an individual, a corporation, an educational institution, a government agency, etc.) that provides one or more services to a destination using a server and/or other devices. Services may include instructions that are executed by a destination to perform an operation. Alternatively, a service may include instructions that are executed on behalf of a destination to perform an operation on the destination's behalf.

The distributed implementation may include a target environment 1640 that includes a device that receives information over communication network 1610. The distributed implementation may also include a cluster 1660 that includes a number of units of execution (UEs) 1670 and may perform processing on behalf of a computer and/or another device, such as service provider. For example, in one embodiment a cluster 1660 may perform parallel processing on a problem received from a computer and/or TCE. A cluster 1660 may include UEs 1670 that reside on a single device or chip or that reside on a number of devices or chips. In one embodiment, multiple computing devices may execute different threads in a distributed computing environment and at runtime tasks may be dispatched using the dispatch mechanism discussed above to the different threads based on threading information contained in annotations associated with a referenced collection of code.

UEs 1670 may include processing devices that perform operations on behalf of a device, such as a requesting device. In one embodiment, a UE 1670 can be a microprocessor, field programmable gate array (FPGA), and/or another type of processing device. Embodiments of UEs 1670 may include code, such as code for an operating environment. For example, a UE 1670 may run a portion of an operating environment that pertains to parallel processing activities. In one embodiment, a service provider may operate a cluster 1660 and may provide interactive capabilities to a computer on a subscription basis (e.g., via a web service).

A "hardware unit of execution," as the term is used herein, is to be broadly interpreted to include a device (e.g., a hardware resource) that performs and/or participates in parallel programming activities. For example, a hardware unit of execution may perform and/or participate in parallel programming activities in response to a request and/or a task it has received (e.g., received directly or via a proxy). A hardware unit of execution may perform and/or participate in substantially any type of parallel programming (e.g., task, data, stream processing, etc.) using one or more devices. For example, in one implementation, a hardware unit of execution may include a single processing device that includes multiple cores and in another implementation, the hardware unit of execution may include a number of processors. A hardware unit of execution may also be a programmable device, such as a field programmable gate array (FPGA), an application specific integrated circuit (ASIC), a digital signal processor (DSP), etc. Devices used in a hardware unit of execution may be arranged in substantially any configuration (or topology), such as a grid, ring, star, etc. A hardware unit of execution may support one or more threads (or processes) when performing processing operations.

A "software unit of execution," as the term is used herein, is to be broadly interpreted to include a software resource (e.g., a technical computing environment [e.g., MATLAB software], a worker, a lab, etc.) that performs and/or participates in parallel programming activities. For example, a software unit of execution may perform and/or participate in parallel programming activities in response to a receipt of a program and/or one or more portions of the program. A software unit of execution may perform and/or participate in substantially any type of parallel programming using one or more hardware units of execution. Embodiments of a software unit of execution may support one or more threads and/or processes when performing processing operations.

"Parallel programming," as the term is used herein, is to be broadly interpreted to include any type of processing that can be distributed across two or more resources (e.g., software units of execution, hardware units of execution, processors, microprocessors, clusters, labs, etc.) and be performed at substantially the same time. For example, in one implementation, parallel programming may refer to task parallel programming where a number of tasks are processed at substantially the same time on a number of software units of execution. In task parallel programming, each task may be processed independently of other tasks executing at the same time (e.g., a first software unit of execution executing a first task may not communicate with a second software unit of execution executing a second task). In another implementation, parallel programming may refer to data parallel programming, where data (e.g., a data set) is parsed into a number of portions that are executed in parallel using two or more software units of execution. In data parallel programming, the software units of execution and/or the data portions may communicate with each other as processing progresses. In still another implementation, parallel programming may refer to stream parallel programming (also referred to as pipeline parallel programming). Stream parallel programming may use a number of software units of execution arranged in series (e.g., a line) where a first software unit of execution produces a first result that is fed to a second software unit of execution that produces a second result. Stream parallel programming may also include a state where task allocation may be expressed in a directed acyclic graph (DAG) or a cyclic graph with delays). Other implementations may combine two or more of task, data, or stream parallel programming techniques alone or with other types of processing techniques to form hybrid-parallel programming techniques.

Exemplary embodiments may be provided as one or more computer-readable programs embodied on or in one or more mediums. The mediums may include, but are not limited to, a hard disk, a compact disc, a digital versatile disc, a flash memory card, a Programmable Read Only Memory (PROM), a Random Access Memory (RAM), a Read Only Memory (ROM), Magnetoresistive Random Access Memory (MRAM), or a magnetic tape. In general, the computer-readable programs may be implemented in any programming language. Some examples of languages that may be used include MATLAB, Python, C, C++, C#, JAVA, JAVASCRIPT etc. Further, the computer readable programs may be implemented in a hardware description language or any other language that allows prescribing computation. The software programs may be stored on or in one or more mediums as object code.

In exemplary embodiments, the annotations described herein may be utilized as discussed above in conjunction with a technical computing environment (TCE). A TCE may include hardware and/or software based logic that provides a computing environment that allows users to perform tasks related to disciplines, such as, but not limited to, mathematics, science, engineering, medicine, business, etc., more efficiently than if the tasks were performed in another type of computing environment, such as an environment that required the user to develop code in a conventional programming language, such as C++, C, Fortran, Pascal, etc. In one implementation, a TCE may include a dynamically typed language that can be used to express problems and/or solutions in mathematical notations familiar to those of skill in the relevant arts. For example, a TCE may use an array as a basic element, where the array may not require dimensioning. In addition, a TCE may be adapted to perform matrix and/or vector formulations that can be used for data analysis, data visualization, application development, simulation, modeling, algorithm development, etc. These matrix and/or vector formulations may be used in many areas, such as statistics, finance, image processing, signal processing, control design, life sciences, education, discrete event analysis and/or design, state based analysis and/or design, etc.

A TCE may further provide mathematical functions and/or graphical tools (e.g., for creating plots, surfaces, images, volumetric representations, etc.). In one implementation, a TCE may provide these functions and/or tools using toolboxes (e.g., toolboxes for signal processing, image processing, data plotting, parallel processing, optimization, etc.). In another implementation, the TCE may provide these functions as block sets. In still another implementation, the TCE may provide these functions in another way, such as via a library, etc. The TCE may be implemented as a text based environment, a graphically based environment, or another type of environment, such as a hybrid environment that is both text and graphically based.

Exemplary TCEs include, but are not limited to, MATLAB®-based environments by The MathWorks, Inc; Octave; Python; Comsol Script; MATRIXx from National Instruments; Mathematica from Wolfram Research, Inc.; Mathcad from Mathsoft Engineering & Education Inc.; Maple from Maplesoft; Extend from Imagine That Inc.; Scilab from The French Institution for Research in Computer Science and Control (INRIA); Virtuoso from Cadence; or Modelica or Dymola from Dynasim.

Alternative embodiments may implement a TCE in a graphically-based TCE using products such as, but not limited to, Simulink® software, Stateflow® software, SimEvents™ software, etc., by The MathWorks, Inc.; VisSim by Visual Solutions; LabView® by National Instruments; Dymola by Dynasim; SoftWIRE by Measurement Computing; WiT by DALSA Coreco; VEE Pro or SystemVue by Agilent; Vision Program Manager from PPT Vision; Khoros from Khoral Research; Gedae by Gedae, Inc.; Scicos from (INRIA); Virtuoso from Cadence; Rational Rose from IBM; Rhopsody or Tau from Telelogic; Ptolemy from the University of California at Berkeley; or aspects of a Unified Modeling Language (UML) or SysML environment.

Another exemplary embodiment may be implemented in a language that is compatible with a product that includes a TCE, such as one or more of the above identified text-based or graphically-based TCE's. For example, MATLAB (a text-based TCE) may use a first command to represent an array of data and a second command to transpose the array. Another product, that may or may not include a TCE, may be MATLAB-compatible and may be able to use the array command, the array transpose command, or other MATLAB commands. For example, the other product may use the MATLAB commands to perform operations on one or more units of execution.

In an alternative embodiment, the TCE may be implemented in a hybrid TCE that combines features of a text-based and graphically-based TCE. In one implementation, one TCE may operate on top of the other TCE. For example, a text-based TCE (e.g., a MATLAB-based environment) may operate as a foundation and a graphically-based TCE (e.g., Simulink) may operate on top of the MATLAB-based environment and may take advantage of text-based features (e.g., commands) to provide a user with a graphical user interface and graphical outputs (e.g., graphical displays for data, dashboards, etc.).

Exemplary embodiments are described above. It is, however, expressly noted that these exemplary embodiments are not limiting, and it should be appreciated that additions and modifications to what is expressly described herein also are included within the scope of the present invention. Moreover, it is to be understood that the features of the various embodiments described herein are not mutually exclusive and can exist in various combinations and permutations, even if such combinations or permutations are not made express herein, without departing from the spirit and scope of the present invention.

Since certain changes may be made without departing from the scope of the present implementation, it is intended that all matter contained in the above description or shown in the accompanying drawings be interpreted as illustrative and not in a literal sense. Practitioners of the art will realize that the sequence of steps and architectures depicted in the figures may be altered without departing from the scope of the present implementation and that the illustrations contained herein are singular examples of a multitude of possible depictions of the present invention.

We claim:

1. A non-transitory computer-readable medium storing instructions, the instructions comprising:
   one or more instructions that, when executed by one or more processors, cause the one or more processors to:
      obtain scripting language code that references a collection of code for executing a first task and a second task,
         a first portion of the collection of code being associated with a first annotation, of a plurality of annotations, associated with the first task, and
         a second portion of the collection of code being associated with a second annotation, of the plurality of annotations, associated with the second task,
      select, for each of the first task and the second task, one of a plurality of threads based on the plurality of annotations,
         the first annotation specifying a first type of thread to which the first portion of the collection of code should be dispatched, and
         the second annotation specifying a second type of thread to which the second portion of the collection of code should be dispatched;
      dispatch, based on the first annotation specifying the first type of thread, the first task to a first thread, of the plurality of threads, for executing the first task in a scripting language environment;
      dispatch, based on the second annotation specifying the second type of thread, the second task to a second thread, of the plurality of threads, included in a non-scripting language environment,
         the first task or the second task not being dispatched to one or more threads, of the plurality of threads, based on a third annotation, of the plurality of annotations,
         the third annotation specifying an identity of the one or more threads and indicating that the first task or the second task should not be dispatched to the identified one or more threads; and
      cause an execution of the scripting language code,
         during the execution of the scripting language code, the first task being executed via the first thread in the scripting language environment and the second task being executed via the second thread in the non-scripting language environment.

2. The non-transitory computer-readable medium of claim 1, where the collection of code is written in a non-scripting language.

3. The non-transitory computer-readable medium of claim 1, where the scripting language code is written in a first scripting language and the collection of code is written in a second scripting language that differs from the first scripting language.

4. The non-transitory computer-readable medium of claim 1, where the first annotation includes information identifying a first priority associated with the first task and the second annotation includes information identifying a second priority associated with the second task; and
  where the one or more instructions to dispatch the first task to the first thread include:
    one or more instructions that, when executed by the one or more processors, cause the one or more processors to:
      determine that the first priority is a higher priority relative to the second priority, and
      dispatch the first task to the first thread prior to dispatching the second task to the second thread based on the first priority being the higher priority relative to the second priority.

5. The non-transitory computer-readable medium of claim 1, where the one or more instructions to dispatch the first task include:
  one or more instructions that, when executed by the one or more processors, cause the one or more processors to dynamically dispatch the first task to the first thread at runtime based on the first annotation.

6. The non-transitory computer-readable medium of claim 1, where the one or more instructions to dispatch the first task include:
  one or more instructions that, when executed by the one or more processors, cause the one or more processors to dynamically dispatch the first task to the first thread in parallel with dispatching the second task to the second thread.

7. The non-transitory computer-readable medium of claim 1, where the first annotation identifies a first priority of the first task and the second annotation identifies a second priority of the second task, the instructions further comprising:
  one or more instructions that, when executed by the one or more processors cause the one or more processors to determine an order associated with dispatching the first task to the first thread and the second task to the second thread based on the first priority of the first task and the second priority of the second task;
  where the one or more instructions to dispatch the first task include:
    one or more instructions that, when executed by the one or more processors, cause the one or more processors to dispatch the first task to the first thread prior to dispatching the second task to the second thread based on the order.

8. The non-transitory computer-readable medium of claim 1, where the instructions further comprise:
  one or more instructions that, when executed by the one or more processors, cause the one or more processors to:
    provide a user interface for receiving the first annotation and the second annotation; and
    receive the first annotation and the second annotation via the user interface.

9. The non-transitory computer-readable medium of claim 1, where the instructions further comprise:
  one or more instructions that, when executed by the one or more processors, cause the one or more processors to:
    analyze the first portion of the collection of code to determine a task type associated with the first task;
    generate, based on the task type, the first annotation; and
    associate the first annotation with the first portion of the collection of code.

10. The non-transitory computer-readable medium of claim 1, where the collection of code includes one or more of:
  a package,
  a class,
  a method, or
  a field.

11. The non-transitory computer-readable medium of claim 1, where the one or more instructions to dispatch the first task include:
  one or more instructions that, when executed by the one or more processors, cause the one or more processors to perform annotation algebra based on a plurality of specifications included in the first annotation to dynamically dispatch the first task to the first thread at runtime.

12. A method comprising:
  associating a first annotation, of a plurality of annotations, with a first portion of a collection of code and a second annotation, of the plurality of annotations, with a second portion of the collection of code,
    the first annotation being associated with a first task associated with an execution of the first portion of the collection of code,
    the second annotation being associated with a second task associated with an execution of the second portion of the collection of code, and
    associating the first annotation with the first portion of the collection of code and the second annotation with the second portion of the collection of code being performed by a device;
  obtain scripting language code that references the collection of code,
    obtaining the scripting language code being performed by the device;
  selecting, for each of the first task and the second task, one of a plurality of threads based on the plurality of annotations,
    selecting the one of the plurality of threads being performed by the device;
  determining, based on the first annotation identifying a first type of thread to which the first portion of the collection of code should be dispatched, to dispatch the first task to a first thread, of the plurality of threads, included in a scripting language environment,
    determining to dispatch the first task to the first thread being performed by the device;
  determining, based on the second annotation identifying a second type of thread to which the second portion of the collection of code should be dispatched, to dispatch the second task to a second thread, of the plurality of threads, included in a non-scripting language environment,
    determining to dispatch the second task to the second thread being performed by the device;
  dispatching the first task to the first thread and the second task to the second thread,
    the first task or the second task not being dispatched to one or more threads, of the plurality of threads, based on a third annotation, of the plurality of annotations,
      the third annotation specifying an identity of the one or more threads and indicating that the first task or the second task should not be dispatched to the identified one or more threads, and
    dispatching the first task and the second task being performed by the device; and
  causing an execution of the scripting language code,
    causing the execution of the scripting language code being performed by the device, and
    during the execution of the scripting language code, the first task being executed via the first thread in the scripting language environment and the second task being executed via the second thread in the non-scripting language environment.

13. The method of claim 12, where dispatching the first task and the second task includes:
dispatching the first task to the first thread and the second task to the second thread in parallel.

14. The method of claim 12, further comprising:
providing a user interface; and
receiving the first annotation and the second annotation via the user interface.

15. A system comprising:
one or more processors to:
obtain scripting language code that references a collection of code, the collection of code for executing a first task and a second task,
a first portion of the collection of code being associated with a first annotation, of a plurality of annotations, and
a second portion of the collection of code being associated with a second annotation, of the plurality of annotations,
the first annotation identifying a first type of thread to which the first portion of the collection of code is to be dispatched, and
the second annotation identifying a second type of thread to which the second portion of the collection of code is to be dispatched;
select, for each of the first task and the second task, one of the plurality of threads based on the plurality of annotations;
dispatch, based on the first annotation specifying the first type of thread, the first task to a first thread, of the plurality of threads, for executing the first task in a scripting language environment;
dispatch, based on the second annotation specifying the second type of thread, the second task to a second thread, of the plurality of threads, included in a non-scripting language environment,
the first task or the second task not being dispatched to one or more of threads, of the plurality of threads, based on a third annotation, of the plurality of annotations,
the third annotation specifying an identity of the one or more threads and indicating that the first task or the second task should not be dispatched to the identified one or more threads; and
cause an execution of the scripting language code,
during the execution of the scripting language code, the first task being executed via the first thread in the scripting language environment and the second task being executed via the second thread in the non-scripting language environment.

16. The system of claim 15, where the one or more processors are further to:
modify the scripting language code to add a language type corresponding to one or more of the first annotation or the second annotation.

17. The system of claim 15, where, when causing the execution of the scripting language code, the one or more processors are to:
cause the execution of the scripting language code by a software application that is compatible with MATLAB software.

18. A non-transitory computer-readable medium storing instructions, the instructions comprising:
one or more instructions that, when executed by one or more processors, cause the one or more processors to:
obtain scripting language code to be executed in a distributed computing environment,
the distributed computing environment including a plurality of computing devices,
the scripting language code referencing a collection of code for executing a first task and a second task,
a first portion of the collection of code being associated with a first annotation, of a plurality of annotations, associated with the first task,
the first annotation identifying a first type of thread to which the first portion of the collection of code is to be dispatched, and
a second portion of the collection of code being associated with a second annotation, of the plurality of annotations, associated with the second task,
the second annotation identifying a second type of thread to which the second portion of the collection of code is to be dispatched;
select, for each of the first task and the second task, one of a plurality of threads based on the plurality of annotations,
dispatch, based on the first annotation identifying the first type of thread, the first task to a first thread, of the plurality of threads, running in a scripting language environment on a first computing device in the plurality of computing devices;
dispatch, based on the second annotation identifying the second type of thread, the second task to a second thread, of the plurality of threads, running in a non-scripting language environment on a second computing device in the plurality of computing devices,
the first task or the second task not being dispatched to one or more of threads, of the plurality of threads, based on a third annotation, of the plurality of annotations,
the third annotation specifying an identity of the one or more threads and indicating that the first task or the second task should not be dispatched to the identified one or more threads; and
cause an execution of the scripting language code,
during the execution of the scripting language code, the first task being executed via the first thread and the second task being executed via the second thread.

19. The non-transitory computer-readable medium of claim 18, where the first annotation specifies one or more performance parameters corresponding to hardware resources dedicated to processing the first task; and
where the one or more instructions to dispatch the first thread include:
one or more instructions to dispatch the first task to the first thread further based on the one or more performance parameters.

20. The non-transitory computer-readable medium of claim 19, where the one or more performance parameters include one or more of:
a memory size parameter,
a disk size parameter,
a throughput parameter,
a network bandwidth parameter, or
a security parameter.

21. The non-transitory computer-readable medium of claim 18, where the first annotation identifies a user, associated with the first computing device, having access rights to the first task; and where the one or more instructions to dispatch the first task include:

one or more instructions that, when executed by the one or more processors, cause the one or more processors to dispatch the first task to the first thread further based on the user having access rights to the first task.

22. The non-transitory computer-readable medium of claim 18, where the first annotation specifies a first priority of the first task and the second annotation specifies a second priority of the second task; and where the one or more instructions to dispatch the first task and the second task include:

one or more instructions that, when executed by the one or more processors, cause the one or more processors to:

determine an order of dispatching the first task to the first thread and the second task to the second thread based on the first priority of the first task and the second priority of the second task; and dispatch the first task to the first thread and the second task to the second thread based on the order.

23. One or more non-transitory computer-readable media storing instructions, the instructions comprising:

one or more instructions that, when executed by one or more computing devices, cause the one or more computing devices to:

obtain a scripting language code that is associated with a collection of code for executing a first task and a second task;

select, for each of the first task and the second task, one of a plurality of threads based on a plurality of annotations included in the collection of code;

dispatch the first task to a first thread, of the plurality of threads, in a scripting language environment based on a first annotation, of the plurality of annotations included in the collection of code, identifying a first type of thread to which the first task should be dispatched;

dispatch the second task to a second thread, of the plurality of threads, in a non-scripting language environment based on a second annotation, of the plurality of annotations included in the collection of code, identifying a second type of thread to which the second task should be dispatched, the first task or the second task not being dispatched to one or more of threads, of the plurality of threads, based on a third annotation, of the plurality of annotations, the third annotation specifying an identity of the one or more threads and indicating that the first task or the second task should not be dispatched to the identified one or more threads; and cause an execution of the scripting language code, during the execution of the scripting language code, the first task being executed via the first thread in the scripting language environment and the second task being executed via the second thread in the non-scripting language environment.

24. The one or more non-transitory computer-readable media of claim 23, where the first annotation includes information associated with a threading policy; and where the one or more instructions to dispatch the first task to the first thread include:

one or more instructions that, when executed by the one or more computing devices, cause the one or more computing devices to dispatch the first task to the first thread further based on the threading policy.

25. The one or more non-transitory computer-readable media of claim 23, where the first annotation includes performance information or security information associated with the collection of code; and where the one or more instructions to dispatch the first task to the first thread include:

one or more instructions that, when executed by the one or more computing devices, cause the one or more computing devices to dispatch the first task to the first thread further based on the performance information or the security information.

* * * * *